(12) United States Patent
Oshima

(10) Patent No.: US 12,284,434 B2
(45) Date of Patent: Apr. 22, 2025

(54) IMAGING SYSTEM, SERVER, COMMUNICATION TERMINAL, IMAGING METHOD, PROGRAM, AND RECORDING MEDIUM

(71) Applicant: FUJIFILM Corporation, Tokyo (JP)

(72) Inventor: Kazuki Oshima, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 367 days.

(21) Appl. No.: 17/505,325

(22) Filed: Oct. 19, 2021

(65) Prior Publication Data

US 2022/0159177 A1    May 19, 2022

(30) Foreign Application Priority Data

Nov. 18, 2020 (JP) ................. 2020-191500

(51) Int. Cl.
| | |
|---|---|
| G06F 16/00 | (2019.01) |
| G06F 16/53 | (2019.01) |
| G06F 16/583 | (2019.01) |
| G06F 18/22 | (2023.01) |
| H04N 1/00 | (2006.01) |
| H04N 23/60 | (2023.01) |

(52) U.S. Cl.
CPC ............ H04N 23/64 (2023.01); G06F 16/53 (2019.01); G06F 16/5854 (2019.01); G06F 18/22 (2023.01); H04N 1/00244 (2013.01); *H04N 2201/0084* (2013.01)

(58) Field of Classification Search
CPC ....... G06F 16/83; G06F 16/5854; G06F 16/53
USPC ....................................................... 707/758
See application file for complete search history.

(56) References Cited

U.S. PATENT DOCUMENTS

| | | | | |
|---|---|---|---|---|
| 8,429,173 B1 * | 4/2013 | Rosenberg | .......... | G06F 16/5866 707/758 |
| 8,521,737 B2 * | 8/2013 | Hart | ...................... | G06F 16/583 707/758 |
| 2015/0186425 A1 * | 7/2015 | Chang | ..................... | G06F 16/58 707/728 |

(Continued)

FOREIGN PATENT DOCUMENTS

| | | |
|---|---|---|
| JP | 2003-333498 A | 11/2003 |
| JP | 2003-348519 A | 12/2003 |

(Continued)

*Primary Examiner* — Ann J Lo
*Assistant Examiner* — Rezwanul Mahmood
(74) *Attorney, Agent, or Firm* — Studebaker Brackett PLLC

(57) ABSTRACT

In an imaging system, a server, a communication terminal, an imaging method, a program, and a recording medium, a first image is analyzed for each first image, a feature value of the first image is acquired, and the first image, a set value regarding capturing of the first communication terminal in a case where the first image is captured, and the feature value of the first image are stored in association with each other in a memory. A first image associated with a feature value coincident with or similar to a feature value of a second image is searched for from among the first images stored in the memory, and a set value associated with the searched first image is acquired from among the set values stored in the memory. The acquired set value is set for a second communication terminal, and an image is captured based on the set value.

20 Claims, 4 Drawing Sheets

(56) References Cited

U.S. PATENT DOCUMENTS

| | | | | |
|---|---|---|---|---|
| 2015/0193863 A1* | 7/2015 | Cao | ............... | G06F 16/583 |
| | | | | 705/27.2 |
| 2016/0132533 A1* | 5/2016 | Kim | ............... | G06F 16/58 |
| | | | | 382/305 |
| 2016/0179847 A1* | 6/2016 | Epstein | ............. | G06Q 30/0623 |
| | | | | 707/737 |
| 2017/0024419 A1* | 1/2017 | Gotoh | ............... | G06F 16/176 |
| 2017/0339340 A1* | 11/2017 | De Bayser | ............. | G10L 15/22 |
| 2018/0061051 A1* | 3/2018 | Matsunaga | ......... | A61B 5/7267 |
| 2019/0205331 A1* | 7/2019 | Cevahir | ............... | G06N 3/088 |
| 2020/0035350 A1* | 1/2020 | Sullivan | ............... | G06T 11/001 |
| 2020/0036889 A1* | 1/2020 | Udayakumar | ....... | H04N 23/635 |
| 2020/0074218 A1* | 3/2020 | Godhantaraman | .. | G06V 40/103 |
| 2020/0125886 A1* | 4/2020 | Baijal | ............... | G06V 20/40 |
| 2020/0242479 A1* | 7/2020 | Kim | ............... | G06V 20/41 |
| 2021/0065413 A1* | 3/2021 | Huang | ............... | G16H 30/40 |
| 2021/0109963 A1* | 4/2021 | Fu | ............... | G06T 7/11 |
| 2021/0248716 A1* | 8/2021 | Vera-Gonzalez | ........ | G06N 3/08 |
| 2021/0272290 A1* | 9/2021 | Keshwani | ............... | A61B 6/03 |
| 2021/0303986 A1* | 9/2021 | Saha | ............... | G06F 16/285 |
| 2022/0044059 A1* | 2/2022 | Takahashi | ............ | G06V 10/751 |
| 2022/0108447 A1* | 4/2022 | Kayser | ............... | A61B 5/445 |
| 2022/0159177 A1* | 5/2022 | Oshima | ............... | G06F 16/53 |
| 2022/0237901 A1* | 7/2022 | Li | ............... | G06V 10/40 |
| 2023/0252772 A1* | 8/2023 | Kim | ............... | G06V 10/776 |
| | | | | 382/159 |
| 2023/0266193 A1* | 8/2023 | Zhao | ............... | G01J 5/0014 |
| | | | | 73/40 |
| 2023/0281968 A1* | 9/2023 | Kobayashi | ............ | G06T 7/0012 |
| | | | | 382/128 |
| 2023/0282336 A1* | 9/2023 | Fuchigami | ............ | G16H 30/40 |
| | | | | 382/100 |
| 2023/0351730 A1* | 11/2023 | Okano | ............... | G06V 10/7715 |

FOREIGN PATENT DOCUMENTS

| | | |
|---|---|---|
| JP | 2009-065448 A | 3/2009 |
| JP | 2014-180024 A | 9/2014 |

* cited by examiner

IMAGING SYSTEM, SERVER, COMMUNICATION TERMINAL, IMAGING METHOD, PROGRAM, AND RECORDING MEDIUM

CROSS-REFERENCE TO RELATED APPLICATIONS

The present application claims priority under 35 U.S.C. § 119 to Japanese Patent Application No. 2020-191500 filed on Nov. 18, 2020. Each of the above application is hereby expressly incorporated by reference, in its entirety, into the present application.

BACKGROUND OF THE INVENTION

1. Field of the Invention

The present invention is an imaging system, a server, a communication terminal, an imaging method, a program, and a recording medium that capture an image by using a set value regarding capturing of a camera in a case where an image having the same feature value is captured by another user according to a feature value of an image to be captured next by a user.

2. Description of the Related Art

A user with little knowledge of a camera merely captures an image of a subject such as a child vaguely with an auto mode set. Originally, the user can capture an image (photograph) in various expressions by changing the setting of the camera, but is unaware of the change of the camera setting.

Even though the user with little knowledge of the camera finds their favorite image through a social networking service (SNS) or the like, since the user does not know how can the user change the camera setting to obtain such an image, the user gives up the change of the camera setting before actually capturing.

For example, in a case where the user finds an image on which a child is beautifully captured at a sports meeting through SNS or the like and wants to capture such an image, the user immediately forgets such an image and captures an image with an auto mode set without any particular consciousness at an actual sports meeting.

There are some users who cannot clearly grasp their favorite images and images the users want to capture in the first place.

Here, the related arts related to the present invention include JP2009-065448A, JP2014-180024A, JP2003-333498A, and JP2003-348519A.

In JP2009-065448A describes a network control apparatus that receives pieces of attribute information on a plurality of images including information regarding a color temperature of an image from a plurality of digital cameras, decides common parameters used in common to image processing for the plurality of images based on the received pieces of attribute information on the plurality of images, and sequentially displays the plurality of images on which the image processing is performed by using the decided common parameters on a display unit.

JP2014-180024A describes an imaging apparatus that acquires detection information of an imaging signal captured by another camera and performs imaging control and signal processing control adapted to an imaging scene by using the detection information.

JP2003-333498A describes an imaging condition data distribution system in which a subject image to be captured is sent from a digital camera to a server, features of a subject are extracted from the subject image in the server, a sample image similar to the subject image is searched for based on feature information included in the sample image from sample images stored in associated with imaging condition data, the imaging condition data is extracted, and the imaging condition data is distributed from the server to the digital camera.

JP2003-348519A describes an imaging system in which a server searches for image information corresponding to positional information received from a digital camera from among pieces of image information stored in association with the positional information, transmits the searched image information and control information which is added to the searched image information and sets an imaging condition for the digital camera to the digital camera, and the digital camera sets the imaging condition based on the control information received from the server.

SUMMARY OF THE INVENTION

In JP2009-065448A, there is an attempt to reduce variations in tint of the plurality of images or the like, but this technology is not limited to the tint or the like preferred by the user who browses the images. In a case where set values regarding the capturing of the digital camera can be changed, an expression that cannot be handled by the image processing can be performed, but JP2009-065448A does not describe that the set values regarding the capturing of the digital camera are changed.

In JP2014-180024A, a plurality of cameras are required in order to perform control adapted to the imaging scene.

JP2003-333498A describes that a sample photograph and capturing data are stored in association with each other for each famous photographer, but does not describe that a photograph captured by another user and capturing data from a digital camera of another user are acquired and used. JP2003-333498A describes that the sample image includes the feature information in addition to image data, but does not describe that the sample image is analyzed to acquire a feature value of the sample image.

JP2003-348519A describes that the control information is added to the image information, but does not describe that image information of an image captured by another user and control information are acquired and used from a digital camera of another user. JP2003-348519A describes that the image information is stored in association with the positional information, but does not describe that the image information is analyzed to acquire the positional information of the image.

An object of the present invention is to provide an imaging system, a server, a communication terminal, an imaging method, a program, and a recording medium capable of capturing an image as even a user having little knowledge of a camera wants to capture.

In order to achieve the above object, the present invention provides a server accessed by a plurality of communication terminals of a plurality of users. The server comprises a first processor. The first processor receives first images captured by one or more first communication terminals and set values regarding capturing of the first communication terminals in a case where the first images are captured from the first communication terminals, acquires a feature value of the first image by analyzing the first image for each first image, stores the first image, the set value, and the feature value in association with each other for each first image in a memory, searches for the first image associated with a feature value coincident with or similar to a feature value of a second image received from a second communication terminal by the first processor from among the first images stored in the memory, acquires a set value associated with the first image searched for by the first processor from among the set values stored in the memory, and transmits the set value acquired by the first processor to the second communication terminal.

Here, it is preferable that the first processor stores the first image, the set value, and the feature value in association with each other for each user in the memory, analyzes an image preference of a user of the second communication terminal based on the feature value of the first image of the user of the second communication terminal stored in the memory, and searches for a first image associated with a feature value coincident with or similar to the image preference of the user of the second communication terminal from among the first images stored in the memory.

It is preferable that the first processor receives at least one of a positive evaluation or a negative evaluation voted for the first image by a user of the first communication terminal from the first communication terminal, stores the first image and the number of all evaluations voted for the first image in association with each other in the memory, receives a search instruction based on the evaluation from the second communication terminal, and searches for a predetermined number of the first images based on the number of evaluations from among the first images stored in the memory in response to the instruction.

It is preferable that the first processor receives a voting date and time of the evaluation from the first communication terminal, stores the first image and the voting date and time of the evaluation in association with each other in the memory, receives a voting period of the evaluation from the second communication terminal, and searches for a first image for which the evaluation is voted at the voting date and time in the voting period of the evaluation form among the first images stored in the memory.

It is preferable that the first processor receives a plurality of the second images from the second communication terminal, estimates the feature value of the first image and the feature value of each second image by using a first determination model, estimates degrees of similarity between the feature value of the first image and the feature values of the second images for each first image by using a second determination model, calculates a total degree of similarity between the feature value of the first image and the feature values of the plurality of second images based on the degrees of similarity, and searches for a predetermined number of the first images from a side of which the total degree of similarity is the highest from among the first images stored in the memory.

It is preferable that the first determination model is a trained model in which a first learning image and a feature value of the first learning image are used as pieces of first training data and a relationship between the first learning image and the feature value of the first learning image is trained for a plurality of the pieces of first training data, and the second determination model is a trained model in which a feature value of a second learning image, a feature value of a third learning image, and a degree of similarity between the feature value of the second learning image and the feature value of the third learning image are used as pieces of second training data and a relationship between the feature value of the second learning image, the feature value of the third learning image, and the degree of similarity between the feature value of the second learning image and the feature value of the third learning image is trained for a plurality of the pieces of second training data.

It is preferable that the first processor receives a plurality of the second images from the second communication terminal, estimates the feature value of the first image and the feature value of each second image by using a first determination model, calculates distances between the feature value of the first image and the feature values of the second images for each first image, calculates a total degree of similarity between the feature value of the first image and the feature values of the plurality of second images based on the distances, and searches for a predetermined number of the first images from a side on which the total degree of similarity is the highest from among the first images stored in the memory.

It is preferable that the first processor stores the first image, the set value, the feature value, and a text-format tag expressing the feature value of the first image in association with each other in the memory, receives a text-format search key from the second communication terminal, and searches for the first image to which a tag coincident with the search key is assigned from among the first images stored in the memory.

It is preferable that the first processor acquires, as the feature value, a feature value of a concept of a first layer which is widest, and acquires feature values of concepts of a second layer to an n-th layer sequentially narrower from the concept of the first layer in which n is an integer of 2 or more, and searches for a predetermined number of the first images from among the first images stored in the memory by using at least one of the feature values of the concepts of the first layer to the n-th layer.

It is preferable that the first processor receives information on a first image selected by a user of the second communication terminal from among a plurality of the first images searched for by the first processor, and acquires a set value associated with a first image corresponding to the information on the first image from among the set values stored in the memory.

It is preferable that the set value includes at least one value of a stop, a shutter speed, a focal length, or an ISO sensitivity of the first communication terminal in a case where the first image is captured.

It is preferable that the feature value includes at least one of header information of the first image, a subject appearing in the first image, or a scene of the first image.

The present invention provides an imaging system comprising any server described above, and the plurality of communication terminals. The first communication terminal includes a second processor, the second communication terminal includes a third processor, the second processor transmits the first image and the set value to the server, and the third processor receives the set value acquired by the first processor from the server, sets the set value received by the third processor for the second communication terminal, and captures an image based on the set value set by the third processor.

Here, it is preferable that the communication terminal includes a camera, a camera of the first communication terminal includes the second processor, a camera of the second communication terminal includes the third processor, the second processor transmits the first image and the set value to the server, and the third processor transmits the feature value of the second image to the server, receives the set value acquired by the first processor from the server, sets the set value received by the third processor for the camera of the second communication terminal, and captures an image based on the set value set by the third processor.

It is preferable that the following operations are repeated in which the third processor recognizes a subject appearing in a live preview image captured by the third processor, and outputs information on the subject, and whenever the subject appearing in the live preview image is recognized by the third processor and different information on the subject is output, the third processor transmits the information on the subject to the server, the first processor receives the information on the subject from the camera of the second communication terminal, searches for a first image associated with a feature value of a subject coincident with or similar to the information on the subject from among the first images stored in the memory, acquires a set value associated with the first image searched for by the first processor from among the set values stored in the memory, and transmits the set value acquired by the first processor to the second communication terminal, and the third processor receives the set value acquired by the first processor from the server, and sets the set value received by the third processor for the camera of the second communication terminal.

It is preferable that the communication terminal includes a camera having a communication function and an information terminal having a communication function, an information terminal of the first communication terminal includes the second processor, an information terminal of the second communication terminal includes a fourth processor, a camera of the second communication terminal includes a fifth processor, the second processor transmits the first image and the set value received from a camera of the first communication terminal by the communication function to the server, the fourth processor transmits the feature value of the second image to the server, and receives the set value acquired by the first processor from the server, and the fifth processor sets the set value received from the information terminal of the second communication terminal by the communication function for the camera of the second communication terminal, and captures an image based on the set value set by the fifth processor.

The present invention provides a communication terminal comprising a second processor. The second processor transmits at least one of the first image, the set value, or the feature value of the second image to any server described above, receives the set value acquired by the first processor from the server, sets the set value received by the second processor for the communication terminal, and captures an image based on the set value set by the second processor.

The present invention provides an imaging method in an imaging system that includes a plurality of communication terminals of a plurality of users and a server accessed by the plurality of communication terminals. The method comprises a step of transmitting, by one or more first communication terminals, first images captured by the first communication terminals and set values regarding capturing of the first communication terminals in a case where the first images are captured to the server, a step of receiving, by a first reception unit of the server, the first image and the set value of the first image from the first communication terminal, a step of analyzing, by a feature value acquisition unit of the server, the first image to acquire a feature value of the first image for each first image, a step of storing the first image, and the set value and the feature value of the first image in association with each other for each first image in a memory of the server, a step of transmitting, by a second transmission unit of a second communication terminal, a feature value of a second image to the server, a step of receiving, by the first reception unit, the feature value of the second image from the second communication terminal, a step of searching for, by an image search unit of the server, a first image associated with a feature value coincident with or similar to the feature value of the second image received by the first reception unit from among the first images stored in the memory, a step of acquiring, by a set value acquisition unit of the server, a set value associated with the first image searched for by the image search unit from among the set values stored in the memory, a step of transmitting, by a first transmission unit of the server, the set value acquired by the set value acquisition unit to the second communication terminal, a step of receiving, by a second reception unit of the second communication terminal, the set value acquired by the set value acquisition unit from the server, a step of setting, by a setting unit of the second communication terminal, the set value received by the second reception unit for the second communication terminal, and a step of capturing, by an imaging unit of the second communication terminal, an image based on the set value set by the setting unit.

The present invention provides a program causing a computer to execute the steps of the imaging method.

The present invention provides a computer-readable recording medium having a program causing a computer to execute the steps of the imaging method recorded thereon.

According to the present invention, the user can capture the image by using the same set value as the set value of the communication terminal in a case where the image having the feature value coincident with or similar to the feature value of the image to be captured next is captured. Accordingly, even the user having little knowledge of the camera can quickly and easily capture the image as the user wants to capture.

DESCRIPTION OF THE PREFERRED EMBODIMENTS

Hereinafter, an imaging system, a server, a communication terminal, an imaging method, a program, and a recording medium according to an embodiment of the present invention will be described in detail based on preferred embodiments shown in the accompanying drawings.

Figure 1:
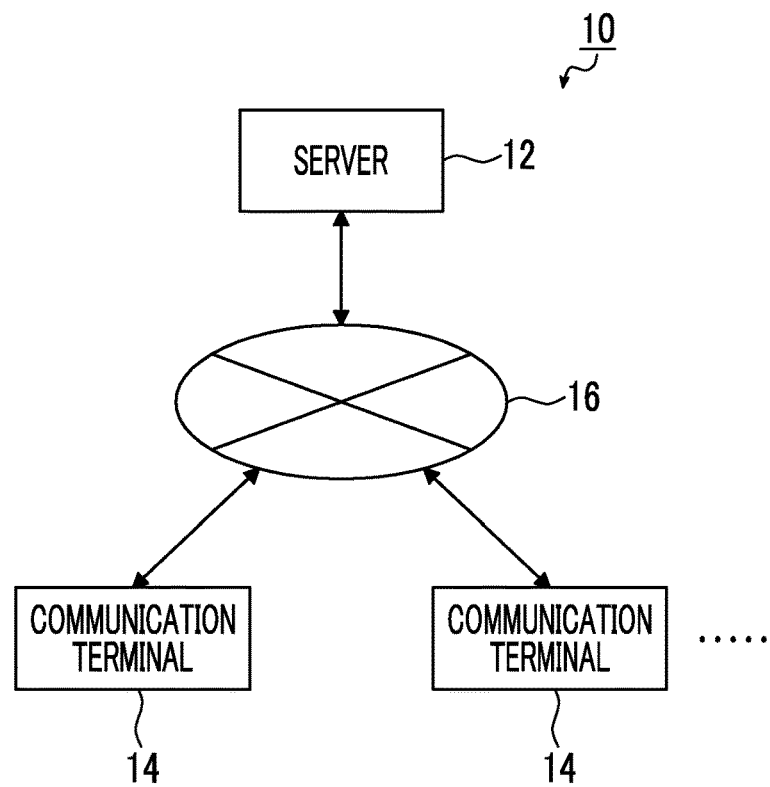
FIG. 1 is a block diagram of an embodiment showing a configuration of an imaging system according to an embodiment of the present invention.

FIG. 1 is a block diagram of an embodiment showing a configuration of the imaging system according to the embodiment of the present invention. The imaging system 10 shown in FIG. 1 comprises a plurality of communication terminals 14 owned by a plurality of users, and a server 12 accessed by the plurality of communication terminals 14. The server 12 and each of the plurality of communication terminals 14 are connected to each other via a network 16 such as the Internet, a telephone line, and Wireless Fidelity (Wi-Fi). Accordingly, the server 12 and each communication terminal 14 can transmit and receive data to and from each other.

Figure 2:
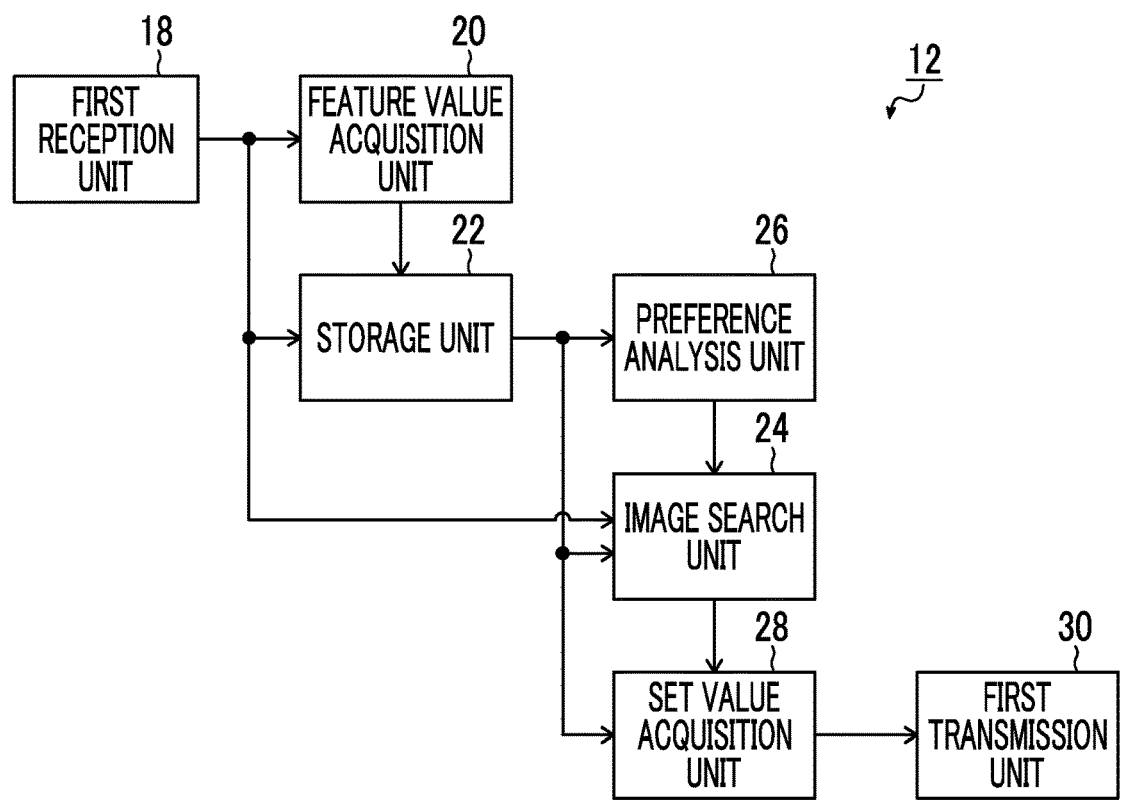
FIG. 2 is a block diagram of an embodiment showing a configuration of a server.

The server 12 receives an image captured by the communication terminal 14 and set values regarding the capturing of the communication terminal 14 in a case where this image is captured, and transmits, to the communication terminal 14 of a user, set values suitable for feature values of an image to be captured next by the user in response to a request from the user. As shown in FIG. 2, the server 12 comprises a first reception unit 18, a feature value acquisition unit 20, a storage unit 22, an image search unit 24, a preference analysis unit 26, a set value acquisition unit 28, and a first transmission unit 30.

The first reception unit 18 receives various kinds of data from the communication terminal 14. For example, the first reception unit 18 receives, from a first communication terminal 14, a first image captured by the first communication terminal 14, and set values and the like regarding the capturing of the first communication terminal 14 in a case where the first image is captured. The first reception unit 18 receives a feature value of the second image and the like from a second communication terminal 14.

The first communication terminal 14 is one or more communication terminals among the plurality of communication terminals 14, and transmits the first image and the set values to the server 12.

The first image is one or more images captured by the first communication terminal 14.

The set values are values (imaging conditions) of various setting items regarding the capturing of the first communication terminal 14, and are not particularly limited. However, the set value desirably includes at least one value of a stop, a shutter speed, a focal length, or an ISO sensitivity of the first communication terminal 14 in a case where the first image is captured. The set value may include values of other setting items. For example, the set values can be extracted from header information such as exchangeable image file format (Exif) of the first image.

The second communication terminal 14 is one communication terminal among the plurality of communication terminals 14, and transmits the feature value of the second image to the server 12, and receives set values suitable for a feature value of an image to be captured next by a user of the second communication terminal 14 from the server 12.

The second image is a sample image for the user of the second communication terminal 14 to search for the first image having the feature value coincident with or similar to the feature value of the image to be captured next by using the second communication terminal 14.

The feature value acquisition unit 20 analyzes the first image for one or more analysis items for each first image received by the first reception unit 18, and acquires the feature value of the first image.

The analysis item is not particularly limited, and may include analysis of image quality of the first image such as brightness, hue (chroma saturation), sharpness, contrast, and a degree of blurriness of the first image.

The analysis item may include analysis of contents of the first image, such as detection of subjects (persons and objects other than persons) in appearing the first image, detection of the number of subjects, detection of movement of subjects, detection of behaviors of subjects, detection of a scene of the first image, and the like.

The analysis item may include analysis of attributes of the first image, such as an imaging date and time, an imaging location, a model name of the communication terminal 14, and a lens name included in the header information of the first image.

The feature value is a value obtained by representing various kinds of information regarding features of the first image by numerical values based on an analysis result of the first image, and is not particularly limited. However, as the feature value, a value obtained by representing the following items (1) to (4) and the like by numerical values are available.

(1) Information regarding the image quality of the first image. For example, information such as brightness and sharpness of the first image.

(2) Information regarding the contents of the first image. For example, information such as the subjects appearing in the first image, the number of subjects, the movement of the subjects, the behaviors of the subjects, and the scene of the first image.

(3) Information regarding the attributes of the first image. Various kinds of information acquired from the header information of the first image and information not regarding the set values, such as the imaging date and time when the first image is captured, the imaging location, the model name of the communication terminal 14, the lens name, and the like.

(4) Information obtained by representing a feature value such as image quality, contents, and attributes of the first image estimated by a determination model (trained model) as a multi-dimensional vector such as 512 dimensions. For example, information such as the subjects appearing in the first image and the scene of the first image.

The feature value acquisition unit 20 may acquire the feature value of the first image by using a determination program or the like that analyzes one or more analysis items by image analysis, or may estimate the feature value of the first image by using a first determination model.

Here, the first determination model is a trained model in which a first learning image and a feature value of the first learning image are used as pieces of first training data and a relationship between the first learning image and the feature value of the first learning image is trained for a plurality of pieces of first training data.

The first determination model receives the first image as an input and estimates the feature value of the first image.

The feature value is not particularly limited, but desirably includes at least one of the header information of the first image, the subject appearing in the first image, or the scene of the first image. The feature value may include other feature values. An item in the header information used as the feature value is also not particularly limited, but desirably includes at least one of the imaging date and time when the first image is captured, the imaging location, the model name of the first communication terminal 14, or the lens name. As the feature value, other items in the header information may be included.

The storage unit 22 is a memory that stores a database including various kinds of data regarding the first image, and stores the first image, the set values, and the feature value in association with each other for each first image. For example, the storage unit 22 stores these pieces of data for each user.

The storage unit 22 is not particularly limited, and a memory device such as a semiconductor memory, a storage device such as a hard disk drive (HDD) and a solid state drive (SSD), and the like are available.

The preference analysis unit 26 analyzes an image preference of the user of the second communication terminal 14 based on the feature value of the first image of the user of the second communication terminal 14 stored in the storage unit 22.

The image preference of the user represents a tendency of an image that the user prefers to capture. For example, in a case where there are many model names and lens names of a specific camera as the feature value of the first image, the preference analysis unit 26 analyzes that the user prefers to capture an image by using the communication terminal 14 of the model name and the lens name. In a case where there are many "children" as the feature value of the first image, the preference analysis unit analyzes that the user prefers to capture an image of "children". In a case where there are many autumn "sports meeting" as the feature value of the first image, the preference analysis unit analyzes that the user prefers to capture an image of "sports meeting" in this season.

The image search unit 24 searches for the first image associated with the feature value coincident with or similar to the feature value of the second image received from the second communication terminal 14 by the first reception unit 18 from among the first images stored in the storage unit 22. The image search unit 24 searches for the first image associated with the feature value coincident with or similar to the image preference of the user of the second communication terminal 14 analyzed by the preference analysis unit 26 from among the first images stored in the storage unit 22.

For example, in a case where the feature value of the second image is "children", the image search unit 24 searches for the first image associated with the feature value of "children" from among the first images stored in the storage unit 22. In a case where the preference analysis unit 26 analyzes that the image preference of the user is to prefer to capture an image of "children", the image search unit 24 searches for the first image associated with the feature value of "children" from among the first images stored in the storage unit 22.

The set value acquisition unit 28 acquires the set values associated with the first image searched for by the image search unit 24 from among the set values stored in the storage unit 22.

For example, in a case where one first image is searched for by the image search unit 24, the set value acquisition unit 28 acquires the set values associated with the one first image from among the set values stored in the storage unit 22. On the other hand, in a case where a plurality of first images are searched for by the image search unit 24, the set value acquisition unit 28 acquires, from the set values stored in the storage unit 22, the set values associated with one first image selected by the user of the second communication terminal 14 from among the plurality of first images.

The first transmission unit 30 transmits various kinds of data to the communication terminal 14. For example, the first transmission unit 30 transmits the set values acquired by the set value acquisition unit 28, the first image searched for by the image search unit 24, and the like to the second communication terminal 14.

The communication terminal 14 transmits, to the server 12, the image captured by the communication terminal 14 and the set values of the communication terminal 14 in a case where this image is captured, and receives the set values of the communication terminal 14 suitable for a feature value of an image to be captured next by the user from the server 12 in response to a request from the user.

Figure 3:
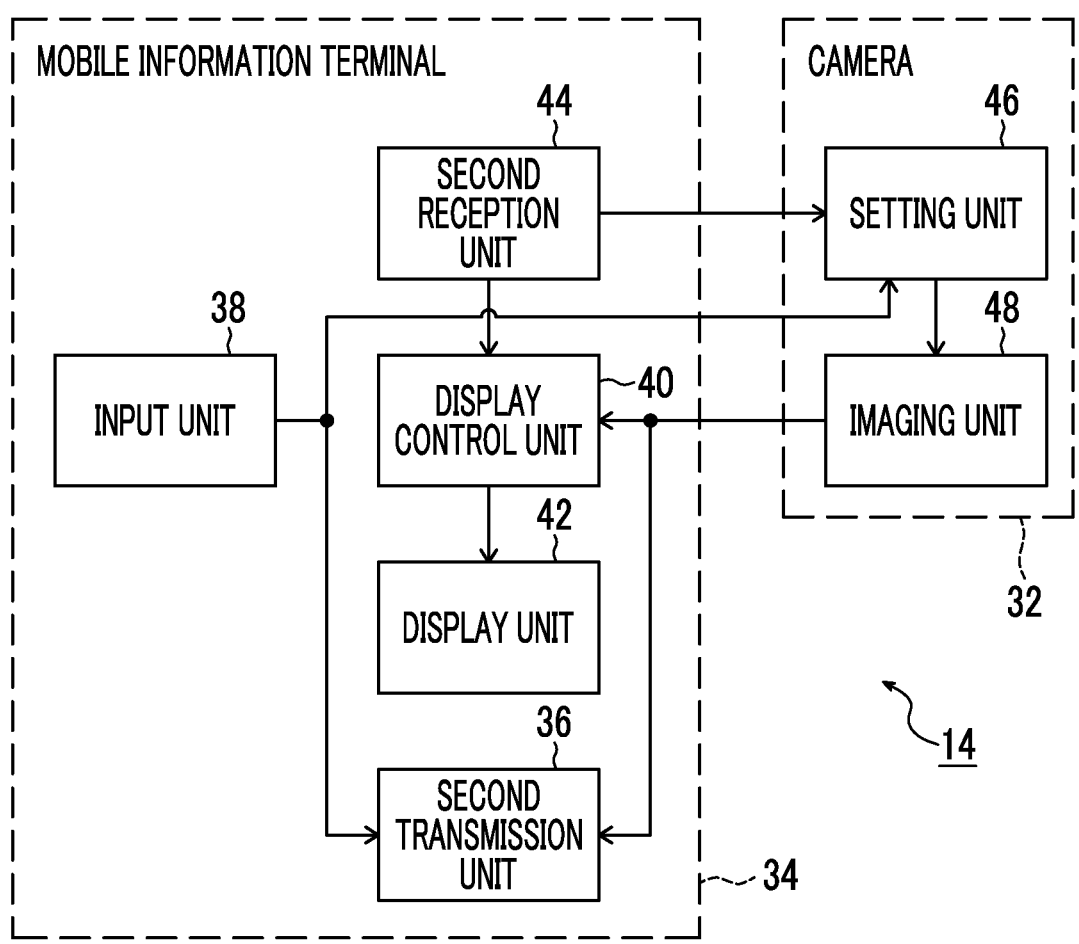
FIG. 3 is a block diagram of an embodiment showing a configuration of a communication terminal.

In the case of the present embodiment, the communication terminal 14 comprises a camera 32 having a communication function and a mobile information terminal 34 having a communication function. The camera 32 is a digital single-lens reflex camera or the like, and comprises a setting unit 46 and an imaging unit 48 as shown in FIG. 3. The mobile information terminal 34 is a smartphone or the like, and similarly comprises a second transmission unit 36, an input unit 38, a display control unit 40, a display unit 42, and a second reception unit 44 as shown in FIG. 3.

The camera 32 and the mobile information terminal 34 also comprises components other than the above components, but the description will be omitted here.

The camera 32 and the mobile information terminal 34 can be connected to each other in a wired manner using, for example, a Universal Serial Bus (USB) cable or in a wireless manner by Bluetooth (registered trademark), Wi-Fi, or the like, and can transmit and receive data to and from each other by a mutual communication function. The communication functions of the camera 32 and the mobile information terminal 34 include a transmission function by a known transmission unit and a reception function by a reception unit. The detailed description of the connection between the camera 32 and the mobile information terminal 34 and the transmission and reception of data will be omitted.

In the mobile information terminal 34, the second reception unit 44 receives various kinds of data from the server 12. For example, the second reception unit 44 of the second communication terminal 14 receives the set values acquired by the set value acquisition unit 28, the first image searched for by the image search unit 24, and the like from the server 12.

The input unit 38 acquires various instructions and the like input from the user. The input unit 38 is not particularly limited, and acquires various instructions and the like input from the user by a touch operation by using a touch panel provided on the display unit 42 on an operation screen (graphical user interface) of an application for implementing the present invention displayed on the display unit 42 in addition to instructions input by physical buttons of the mobile information terminal 34.

For example, the input unit 38 of the first communication terminal 14 acquires an instruction or the like to transmit the first image and the set values to the server 12. The input unit 38 of the second communication terminal 14 acquires an instruction to transmit the feature value of the second image to the server 12, an instruction to select one image from a list of the first images displayed on the display unit 42, an instruction as to whether to set the set values received from the server 12 for the camera 32, and the like.

The display control unit 40 causes the display unit 42 to display various kinds of information. For example, the display control unit 40 causes the display unit 42 to display an image captured by the imaging unit 48, the list of the first images received from the server 12, various operation screens, and the like.

The display unit 42 is a display that displays various kinds of information under the control of the display control unit 40. The display unit 42 is not particularly limited, and is, for example, an image display apparatus such as a liquid crystal display and an organic electro luminescence (EL) display.

Subsequently, the second transmission unit 36 transmits various kinds of data to the server 12. For example, the second transmission unit 36 transmits at least one of the first image, the set values, or the feature value of the second image to the server 12. More specifically, the second transmission unit 36 of the first communication terminal 14 transmits the first image and the set values to the server 12, and the second transmission unit 36 of the second communication terminal 14 transmits the feature value of the second image to the server 12. The second transmission unit 36 transmits various instructions and the like acquired by the input unit 38 to the server 12.

In the camera 32, the setting unit 46 sets the set values received from the mobile information terminal 34 of the second communication terminal 14 to the camera 32 by the communication function. For example, the setting unit 46 of the second communication terminal 14 sets the set values for the camera 32 of the second communication terminal 14.

The imaging unit 48 captures an image in a case where the user presses a shutter button. For example, the imaging unit 48 of the second communication terminal 14 captures an image based on the set value sets by the setting unit 46 of the second communication terminal 14.

Instead of the mobile information terminal 34, an information terminal such as a desktop personal computer (PC), a notebook PC, or a tablet PC having a communication function may be used.

Figure 4:
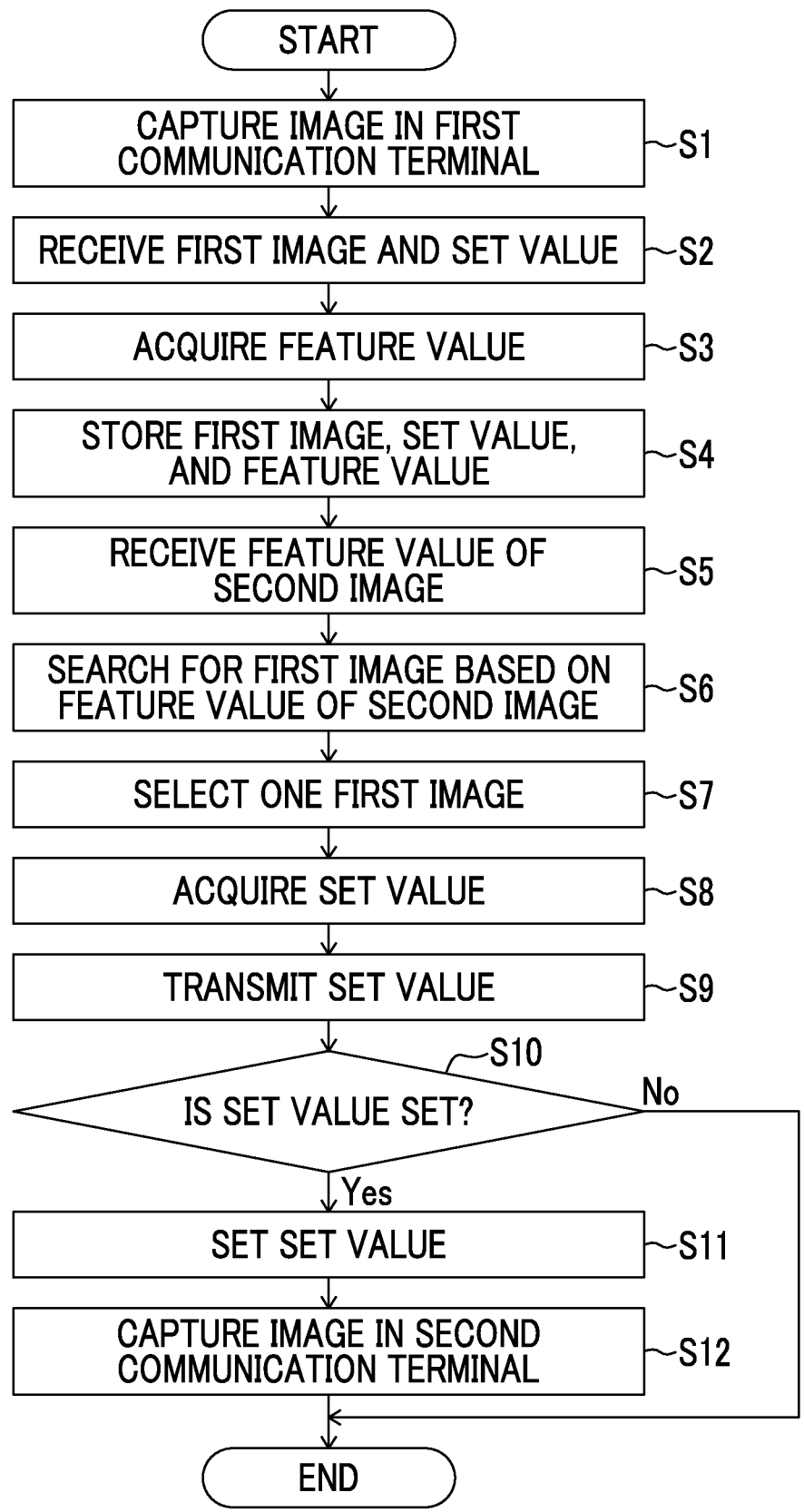
FIG. 4 is a flowchart of an embodiment showing an operation of an imaging system.

Next, an operation of the imaging system 10 will be described with reference to the flowchart shown in FIG. 4.

First, in the first communication terminal 14, the user captures an image by using the camera 32. For example, the user captures an image of their child's foot race at a sports meeting, as shown in a left part of FIG. 5. In this case, in a case where the user presses the shutter button of the camera 32, the imaging unit 48 captures an image of their child at the sports meeting (step S1). The set values of the camera 32 in this case are not particularly limited, and may be, for example, an auto mode or the like.

After the capturing of the image is completed, in a case where the user connects the camera 32 and the mobile information terminal 34 and instructs the transmission of the image, the input unit 38 acquires this instruction. In response to this instruction, as shown in the left part of FIG. 5, the image and the set values regarding the capturing of the camera 32 in a case where the image is captured are transmitted from the camera 32 to the mobile information terminal 34 by the communication function. In the case of the present embodiment, the set values of the camera 32 include the shutter speed, the stop, and the focal length.

Subsequently, as shown in the left part of FIG. 5, the image (first image) received from the camera 32 by the communication function and the set values are similarly transmitted from the mobile information terminal 34 to the server 12 by the second transmission unit 36.

A set value extraction unit may be provided in the first communication terminal 14, and the set value extraction unit of the first communication terminal 14 may extract the set values from the header information of the image, and may transmit the set values to the server 12 from the communication terminal 14. Alternatively, a set value extraction unit may be provided in the server 12, and the set value extraction unit of the server 12 may extract the set values from the header information of the image received from the first communication terminal 14.

Subsequently, in the server 12, the first reception unit 18 receives the first image and the set values from the first communication terminal 14 (step S2).

Subsequently, the first image received by the first reception unit 18 is analyzed by the feature value acquisition unit 20, and the feature value is acquired (step S3). In the case of the present embodiment, the subject appearing in the first image and the scene of the first image are acquired as the feature value of the first image.

Subsequently, as represented in Table 1, an identification (ID: identification number) for each user, a first image represented by an image name, a model name and a lens name of the camera 32, a shutter speed, a stop, and a focal length which are the set values of the camera 32 received by the first reception unit 18, and a subject and a scene which are the feature value of the first image acquired by the feature value acquisition unit 20 are stored in the storage unit 22 in association with each other (step S4).

TABLE 1

| ID | Image name | Camera | Set value of camera | Subject | Scene |
|---|---|---|---|---|---|
| 1 | Sample1.jpg | Model: X-A1 Lens: A | Shutter speed: 1/1000 Stop: 2.0 Focal length: 135 mm | Child Boy Hat | Sports meeting |
| 2 | Sample2.jpg | Model: X-T1 Lens: B | Shutter speed: 1/200 Stop: 2.0 Focal length: 35 mm | Child Girl Dog | Indoor |
| 3 | Sample3.jpg | Model: X-A1 Lens: B | Shutter speed: 1/2000 Stop: 2.0 Focal length: 135 mm | Child Girl Dog Flower | Outdoor |
| ... | ... | ... | ... | ... | ... |

The first images stored in the storage unit 22 are opened to all users who use the imaging system 10. That is, each user can freely browse all the first images of the plurality of users stored in the storage unit 22 on the communication terminal 14 of each user.

Here, in a case where a user who has an image wanted to be captured, in other words, a user who clearly knows a subject and a scene to be captured next captures an image by using the camera 32, the user can select one first image coincident with or similar to an image to be captured next from among the first images stored in the storage unit 22, and can capture the next image by using the set values of the camera 32 in a case where the selected one first image is captured.

In this case, in a case where the user inputs an instruction to browse the list of the first images stored in the storage unit 22 in the second communication terminal 14, the input unit 38 of the mobile information terminal 34 acquires this instruction.

Subsequently, the instruction acquired by the input unit 38 is transmitted to the server 12 by the second transmission unit 36.

Subsequently, in the server 12, the first reception unit 18 receives the instruction from the second communication terminal 14. In response to this instruction, the first transmission unit 30 transmits the list of the first images stored in the storage unit 22 to the second communication terminal 14.

Subsequently, in the second communication terminal 14, the second reception unit 44 of the mobile information terminal 34 receives the list of the first images from the server 12.

Figure 5:
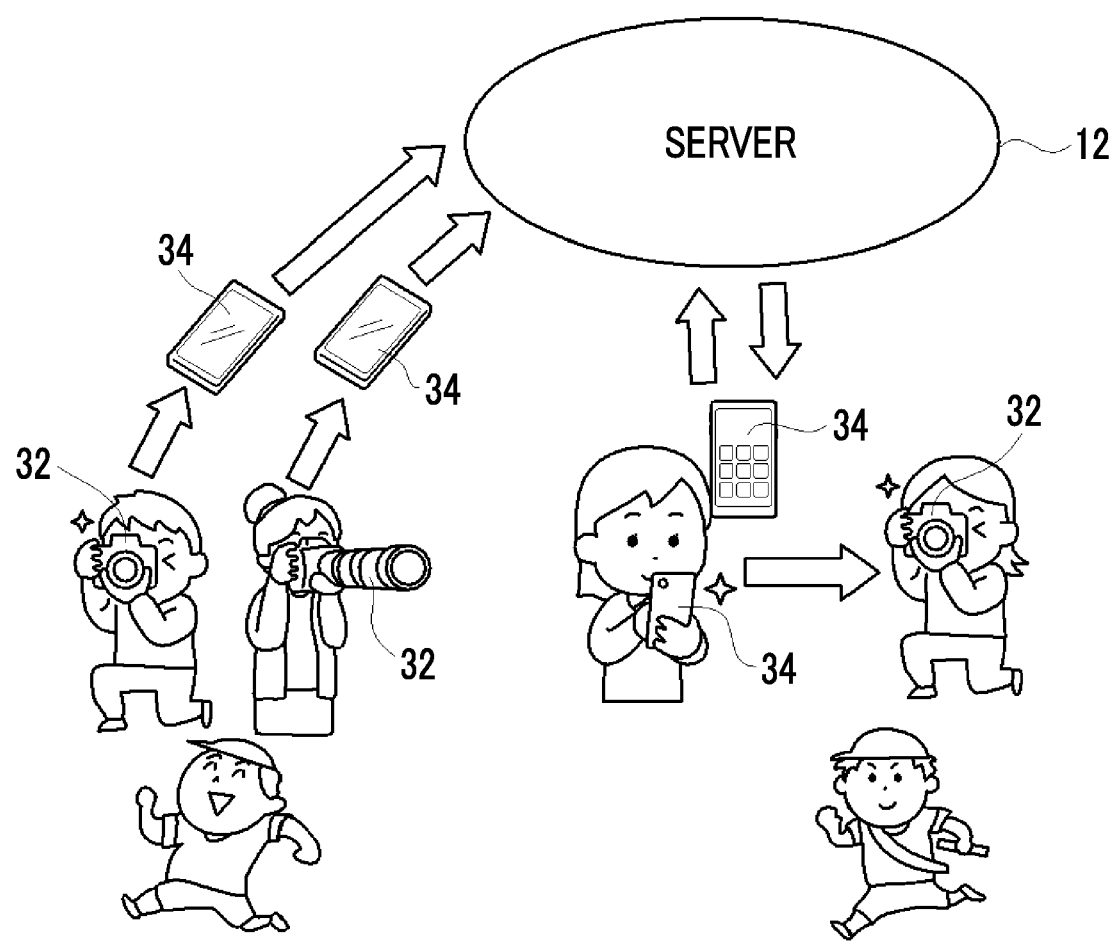
FIG. 5 is a conceptual diagram of an embodiment showing the operation of the imaging system.

As shown in a right part of FIG. 5, the list of the first images received by the second reception unit 44 is displayed on the display unit 42 of the mobile information terminal 34 under the control of the display control unit 40.

Here, the user can search for and narrow down the first image based on, for example, the model name, the lens name, the subject, the scene, and the like of the camera 32 as the feature value of the second image.

In this case, in a case where the user inputs, for example, "sports meeting" and "children" in the second communication terminal 14, the input unit 38 of the mobile information terminal 34 acquires "sports meeting" and "children" as the feature values of the second image.

Subsequently, the second transmission unit 36 transmits the feature value of the second image acquired by the input unit 38 to the server 12.

Subsequently, in the server 12, the first reception unit 18 receives the feature value of the second image from the second communication terminal 14 (step S5).

Subsequently, the image search unit 24 searches for the first image associated with the feature value coincident with the feature value of "sports meeting" and "children" of the second image, that is, the feature value of "sports meeting" and the feature value of "children" from among the first images stored in the storage unit 22 (step S6). For example, in the example of Table 1, an image having an image name of "Sample1.jpg" in which "children" is included in the feature value of the subject and "sports meeting" is included in the feature value of the scene is searched for.

The first transmission unit 30 transmits the list of the first images searched for by the image search unit 24 to the second communication terminal 14.

Subsequently, in the second communication terminal 14, the second reception unit 44 of the mobile information terminal 34 receives the list of the first images searched for by the image search unit 24 from the server 12, and the list of the first images received by the second reception unit 44 is displayed on the display unit 42 under the control of the display control unit 40 as shown in the right part of FIG. 5.

Subsequently, in a case where the user selects one first image having the feature value closest to a feature value of an image to be captured next by the user from the list of the first images displayed on the display unit 42 (step S7), the input unit 38 acquires the information on the first image selected by the user.

Subsequently, the second transmission unit 36 transmits the information on the first image acquired by the input unit 38 to the server 12.

Subsequently, in the server 12, the first reception unit 18 receives the information on the first image from the second communication terminal 14.

Subsequently, the set value acquisition unit 28 acquires the set values associated with the first image corresponding to the information on the first image received by the first reception unit 18 from among the set values stored in the storage unit 22 (step S8).

Subsequently, the first transmission unit 30 transmits the set values acquired by the set value acquisition unit 28 to the second communication terminal 14 (step S9).

Subsequently, in the second communication terminal 14, the second reception unit 44 of the mobile information terminal 34 receives the set values from the server 12.

Subsequently, the set values received by the second reception unit 44 and a message prompting the setting such as "do you want this setting? Yes/No" are displayed on the display unit 42 under the control of the display control unit 40.

On the other hand, in a case where the user selects "No" (No in step S10), the processing ends. In this case, the user can, for example, reselect a desired image from the list of the first images and execute the above operation again.

On the other hand, in a case where the user connects the camera 32 and the mobile information terminal 34 and selects "Yes" (Yes in step S10), the set values received by the second reception unit 44 are transmitted from the mobile information terminal 34 to the camera 32 by the communication function as shown in FIG. 5.

Subsequently, the setting unit 46 of the camera 32 sets the set values received from the mobile information terminal 34 by the communication function for the camera 32 (step S11).

After the setting of the set values is completed, a message such as "setting is completed" is displayed on the display unit 42 under the control of the display control unit 40 of the mobile information terminal 34.

In response to this display, the user of the second communication terminal 14 captures an image to be captured next, for example, an image of their child's foot race in the sports meeting by using the camera 32 for which the set values are set by the setting unit 46, as shown in the right part of FIG. 5 (step S12).

Accordingly, the user can capture an image by using the same set values as the set values of the camera 32 in a case where the image having the feature value coincident with or similar to the feature value of the image to be captured next is captured. Accordingly, even a user with little knowledge of the camera can quickly and easily capture the image as the user wants to capture.

On the other hand, a user who does not have a particular image wanted to be captured, in other words, a user who does not have a particular subject or scene to be captured next can select one first image from among the first images coincident with the image preference of the user automatically searched for among the first images stored in the storage unit 22 by the server 12, and can capture an image by using the set values of the camera 32 in a case where the selected one first image is captured.

In this case, in the server 12, the preference analysis unit 26 analyzes the image preference of the user of the second communication terminal 14 based on the feature value of the first image of the user of the second communication terminal 14 stored in the storage unit 22, for example, the model name and the lens name of the camera 32 in a case where the first image of the user of the second communication terminal 14 is captured, the subject appearing in the first image of the user of the second communication terminal 14, the scene of the first image of the user of the second communication terminal 14, and the like.

For example, in a case where there are many "children" as the feature value of the first image of the user of the second communication terminal 14 stored in the storage unit 22, that is, the user of the second communication terminal 14 frequently captures images of "children", the preference analysis unit analyzes that the user prefers to capture an image of "children".

Subsequently, the image search unit 24 searches for the first image associated with the feature value coincident with or similar to the image preference of the user analyzed by the preference analysis unit 26 from among the first images stored in the storage unit 22.

For example, a camera with the same model name and a lens with the same lens name as the user of the second communication terminal 14 are used, and an image in which the subject coincident with the image preference of the user of the second communication terminal 14 appears and a scene of an event close to a current date is captured is searched for. For example, in the case of a user who frequently captures images of "children", an image of "children" captured by using a camera with the same model name and a lens with the same lens name at a sports meeting event in October 2020 is searched for.

Subsequently, the first transmission unit 30 transmits the list of the first images searched for by the image search unit 24 to the second communication terminal 14.

Subsequently, in the second communication terminal 14, the second reception unit 44 of the mobile information terminal 34 receives the list of the first images from the server 12.

The list of the first images received by the second reception unit 44 is displayed on the display unit 42 under the control of the display control unit 40. That is, the list of the first images coincident with the image preference of the user is proposed to the user.

The subsequent operations are the same.

Accordingly, even though the user does not have a particular image wanted to be captured, an image coincident with the image preference of the user can be quickly and easily captured by using the set values of the camera 32 in a case where one image selected from among images analyzed to be coincident with the preference of the user is captured.

The analysis, search, and display of the image based on the image preference of the user may be performed periodically, for example, once a day, once an hour, or may be executed only once in a case where an application for implementing the present invention is started or in a case where a web page for implementing the present invention is opened.

In the case of the above embodiment, although the user of the second communication terminal 14 browses the list of the first images displayed on the display unit 42 under the control of the display control unit 40 in the mobile information terminal 34, the present invention is not limited thereto. The list of the first images can be browsed in the camera 32. In this case, the camera 32 comprises an input unit 38, a display control unit 40, and a display unit 42 similar to those of the mobile information terminal 34. An operation in a case where the list of the first images is browsed in the camera 32 is the same.

The communication terminal 14 may not include the mobile information terminal 34, and may include only the camera 32.

In this case, in addition to the setting unit 46 and the imaging unit 48, the camera 32 comprises a second reception unit 44, an input unit 38, a display control unit 40, a display unit 42, and a second transmission unit 36 similar to those of the mobile information terminal 34.

First, the second transmission unit 36 of the camera 32 of the first communication terminal 14 transmits the first image and the set values to the server 12.

On the other hand, the second transmission unit 36 of the camera 32 of the second communication terminal 14 transmits the feature value of the second image to the server 12.

Subsequently, the second reception unit 44 of the camera 32 of the second communication terminal 14 receives the set values acquired by the set value acquisition unit 28 from the server 12.

Subsequently, the setting unit 46 of the camera 32 of the second communication terminal 14 sets the set values received by the second reception unit 44 of the camera 32 of the second communication terminal 14 for the camera 32 of the second communication terminal 14.

An image is captured by the imaging unit 48 of the camera 32 of the second communication terminal 14 based on the set values set by the setting unit 46 of the camera 32 of the second communication terminal 14.

The operations of the input unit 38, the display control unit 40, and the display unit 42 of the camera 32 other than the above operations are the same as those of the input unit 38, the display control unit 40, and the display unit 42 of the mobile information terminal 34.

Accordingly, even though the mobile information terminal 34 is not provided, the user can capture an image similarly to the case where the mobile information terminal 34 is provided.

In a case where the list of the first images is browsed, the user of the second communication terminal 14 can search for and narrow down the first image included in the list based on at least one of a positive evaluation or a negative evaluation voted for the first image.

In this case, in a case where the list of the first images is browsed, the user of the first communication terminal 14 not only selects one first image from the list of the first images but also votes at least one of a positive evaluation or a negative evaluation for any first image by tapping and selecting a button to vote a positive evaluation or a negative evaluation for any first image. In response to this evaluation, the second transmission unit 36 transmits this evaluation to the server 12.

Subsequently, in the server 12, the first reception unit 18 receives the evaluation voted for the first image by the user of the first communication terminal 14 from the first communication terminal 14.

Subsequently, the first image and the number of all evaluations voted for the first image are stored in associated with each other in the storage unit 22. For example, whenever the first reception unit 18 receives the positive evaluation voted for the first image, the number of positive evaluations for the first image is incremented one by one. The same is true for the negative evaluation.

In a case where the first image is narrowed down based on the evaluation and the user of the second communication terminal 14 inputs a search instruction based on the evaluation, the input unit 38 acquires this instruction.

Subsequently, the second transmission unit 36 transmits this instruction to the server 12.

Subsequently, in the server 12, the first reception unit 18 receives this instruction from the second communication terminal 14.

Subsequently, the image search unit 24 searches for a predetermined number of first images based on the number of evaluations from among the first images stored in the storage unit 22 in response to this instruction. For example, the image search unit 24 may search for one first image of which the number of positive evaluations is the largest, or a plurality of first images from a side of which the number of positive evaluations is the largest. The plurality of first images may be excluded from a side of which the number of negative evaluations is the largest, and the other first images may be searched for. The image search unit may search for one first image of which the number of evaluations obtained by subtracting the number of negative evaluations from the number of positive evaluations is the largest, or a plurality of first images from the side of which the number of evaluations obtained by the subtraction is the largest.

The subsequent operations are the same.

Accordingly, even though there is no particular image wanted to be captured, the user of the second communication terminal 14 can capture an image by using the same set values as the set values of the first communication terminal 14 in a case where an image popular with plurality of users is captured.

In a case where the list of the first images is browsed, the user can search for and narrow down the first image according to a voting period for the evaluation of the first image, such as an image in the latest week, an image in the latest month, and an image in the latest year.

In this case, in the first communication terminal 14, the second transmission unit 36 transmits a voting date and time of the evaluation for the first image to the server 12.

Subsequently, in the server 12, the first reception unit 18 receives the voting date and time from the first communication terminal 14.

Subsequently, the first image and the voting date and time received by the first reception unit 18 are stored in association with each other in the storage unit 22.

In a case where the first image is narrowed down based on the voting period of the evaluation and the user of the second communication terminal 14 inputs the voting period of the evaluation for the first image, the input unit 38 acquires the voting period.

Subsequently, the second transmission unit 36 transmits this voting period to the server 12.

Subsequently, in the server 12, the first reception unit 18 receives this voting period from the second communication terminal 14.

Subsequently, the image search unit 24 searches for the first image for which the evaluation is voted on the voting date and time within the voting period received by the first reception unit 18 from among the first images stored in the storage unit 22.

The subsequent operations are the same.

Accordingly, the user can capture an image by using the same set values as the set values of the first communication terminal 14 in a case where a trend image reflecting a tendency in the voting period of the evaluation is captured. For example, since images captured by using a newly released camera and lens can be narrowed down by narrowing down the images according to the latest voting period, the user can use the set values suitable for the newly released camera and lens, and the like.

In a case where the list of the first images is browsed, the user can search for and narrow down the image according to the subject appearing in the first image.

In this case, in the camera 32 of the second communication terminal 14, a subject recognition unit that recognizes a subject appearing in a live preview image captured by the imaging unit 48 and outputs information on the subject is provided.

In the second communication terminal 14, whenever the subject appearing in the live preview image is recognized and different information on the subject is output by the subject recognition unit, the following operations are repeated.

First, the second transmission unit 36 of the camera 32 of the second communication terminal 14 transmits the information on the subject recognized by the subject recognition unit to the server 12.

Subsequently, in the server 12, the first reception unit 18 receives the information on the subject from the camera 32 of the second communication terminal 14.

Subsequently, the image search unit 24 searches for the first image associated with the feature value of the subject coincident with or similar to the information on the subject received by the first reception unit 18 from among the first images stored in the storage unit 22.

Subsequently, the set value acquisition unit 28 acquires the set values associated with the first image searched for by the image search unit 24 from among the set values stored in the storage unit 22.

Subsequently, the first transmission unit 30 transmits the set values acquired by the set value acquisition unit 28 to the second communication terminal 14.

Subsequently, in the camera 32 of the second communication terminal 14, the second reception unit 44 receives the set values from the server 12.

For example, the setting unit 46 automatically sets the set values received by the second reception unit 44 for the camera 32 of the second communication terminal 14.

As stated above, in a case where the camera 32 includes the subject recognition unit, the subject of the live preview image is recognized by the subject recognition unit, and, for example, the same subject, the latest one week, and the most popular image are defined as search conditions (feature value of the second image) in advance. Thus, whenever a subject other than a background is captured by the camera 32, the set values coincident with the same search conditions can be received from the server 12, and can be set automatically for the camera 32.

Accordingly, the user of the second communication terminal 14 can save time and effort of search for an image coincident with an image to be captured next from the list of the first images by operating the mobile information terminal 34, and can capture an image by automatically setting the set values with only the camera 32.

The image search unit 24 can search for the first image based on a degree of similarity of the subject, the scene, or the like.

In this case, a similarity calculation unit to be described later is provided in the server 12.

First, the feature value acquisition unit 20 estimates the feature value of the first image for each first image by using the first determination model, and outputs a multi-dimensional vector, for example, a 512-dimensional vector of $(f1\_1, f2\_1, \ldots, f512\_1)$. Based on this 512-dimensional vector, a similarity determination similar to a feeling in a case where a human determines that two images are similar can be performed depending on the degree of similarity or a distance to be described later.

Subsequently, in the second communication terminal 14, the second transmission unit 36 transmits a plurality of second images to the server 12. The plurality of second images are different images, but each second image has a feature value coincident with or similar to a feature value of an image to be captured next by the user of the second communication terminal 14 by using the second communication terminal 14. For example, in a case where the user captures their child in a "foot race", the plurality of second images are all images in which a scene of the child's "foot race" is captured.

Subsequently, in the server 12, the first reception unit 18 receives the plurality of second images from the second communication terminal 14.

Subsequently, the feature value acquisition unit 20 estimates the feature value of the second image for each second image by using the first determination model, and outputs a multi-dimensional vector, similarly, a 512-dimensional vector of $(f1\_2, f2\_2, \ldots, f512\_2)$.

Subsequently, the similarity calculation unit estimates the degree of similarity between the feature value of the first image and the feature value of the second images for each first image.

The similarity calculation unit can calculate the degree of similarity by using a second determination model.

The second determination model is a trained model in which a feature value of a second learning image, a feature value of a third learning image, and a degree of similarity between the feature value of the second learning image and the feature value of the third learning image are used as pieces of second training data and a relationship between the feature value of the second learning image and the feature value of the third learning image and the degree of similarity between the feature value of the second learning image and the feature value of the third learning image is trained for a plurality of pieces of second training data.

The second determination model receives the feature value of the first image and the feature value of the second image as inputs, and estimates the degrees of similarity between the feature value of the first image and the feature value of the second images for each first image.

In a case where the second determination model is trained, for example, pieces of correct answer data including the feature value of the second learning image and the feature value of the third learning image similar to each other, and the degree of similarity (numerical value) indicating how similar are the second learning image and the third learning image are given as the pieces of second training data, and training is repeated for the plurality of pieces of second training data. The feature value of the first image and the feature value of the second image are given as inputs by using the second determination model trained in this manner. Thus, the degree of similarity (numerical value) indicating whether the feature value of the first image and the feature value of the second image are similar and how similar are the first image and the second image can be output.

Alternatively, the similarity calculation unit can calculate a distance d1_2 between the 512-dimensional vector (f1_1, f2_1, ..., f512_1) which is the feature value of the first image and the 512-dimensional vector (f1_2, f2_2, ..., f512_2) which is the feature value of each second image for each first image by using the following Equation (1), and can use the distance d1_2 as the degree of similarity between the feature value of the first image and the feature value of the second image.

$$d1\_2 = \sqrt{\{(f1\_1 - f1\_2)^2 + (f2\_1 - f2\_2)^2 + (f512\_1 - f512\_2)^2\}} \quad \text{Equation (1)}$$

Instead of Equation (1), various calculation expressions for calculating a distance by mathematics can be similarly used, such as a case where the sum of absolute values of differences between two values is obtained and the distance is calculated. The distance becomes shorter, the degree of similarity becomes higher. Thus, it is easier to handle the degree of similarity as a degree of similarity s1_2 (=1/d1_2) by using the reciprocal of the distance d1_2. In order to further ease the handling, the degree of similarity s1_2 may be standardized so as to be in a range of 0 to 100 or the like.

The similarity calculation unit calculates that a total degree of similarity between the feature value of the first image and the feature values of the plurality of second images based on the degree of similarity or the distance between the feature value of the first image and the feature values of each second image. For example, as represented in Table 2, a total degree of similarity=85 is calculated by obtaining the arithmetic mean of a degree of similarity between first image 1 and second image A=85, a degree of similarity between first image 1 and second image B=87, and a degree of similarity between first image 1 and second image C=83.

TABLE 2

| First image | Degree of similarity with second image A | Degree of similarity with second image B | Degree of similarity with second image C | Total degree of similarity |
|---|---|---|---|---|
| 1 | sA_1 = 85 | sB_1 = 87 | sC_1 = 83 | (sA_1 + sB_1 + sC_1)/3 = 85 |
| 2 | sA_2= | sB_2= | sC_2= | ... |
| 3 | sA_3= | sB_3= | sC_3= | ... |
| ... | ... | ... | ... | ... |
| 999 | sA_999= | sB_999= | sC_999= | ... |
| 1000 | sA_1000= | sB_1000= | sC_1000= | ... |

The total degree of similarity between the other first images 2, 3, ... and the second images A, B, and C is also calculated in the same manner. A method for calculating the total degree of similarity is not limited to the arithmetic mean, and any calculation expression can be used as long as the calculation expression comprehensively represents the degrees of similarity between the first image and the plurality of second images.

Subsequently, the image search unit 24 searches for the predetermined number of first images from the side on which the total degree of similarity is the highest from among the first images stored in the storage unit 22 based on an estimation result of the degree of similarity by the second determination model. For example, one first image of which the total degree of similarity is the highest or a plurality of first images are searched for from the side on which the total degree of similarity is the highest.

The subsequent operations are the same.

In the search for the first image based on the above degree of similarity, for example, at the sports meeting, in a case where a user's child participates in a foot race, images of children's foot race other than the user's child are captured as the plurality of second images, and the plurality of second images are transmitted to the server 12. However, in a case where the user's child happens to be a runner of a first group of the foot race, it is difficult to capture the images of the other children's foot race and transmit the images to the server 12.

As a coping method in such a case, the image search unit 24 may search for the first image by a search key for searching for the first image stored in the storage unit 22.

In this case, the first image, the set values and the feature value, and text-format tags expressing the feature value of the first image such as the subject and the scene by words or sentences in natural language are stored in association with each other in the storage unit 22. For example, in a case where the feature value of the first image is "children", a text-format tag of "children" is stored.

A method for assigning the tag is not particularly limited. A tag assignment unit may be provided in the server 12 or the communication terminal 14, and the tag assignment unit may automatically assign the text-format tags expressing the feature value of the first image. Alternatively, each user may manually assign the text-format tags expressing the feature value of the first image, or both the automatic tag assignment by the tag assignment unit and the manual tag assignment by the user may be combined.

Subsequently, in the second communication terminal 14, the second transmission unit 36 transmits a text-format search key, for example, "children" to the server 12.

Subsequently, in the server 12, the first reception unit 18 receives the search key from the second communication terminal 14.

Subsequently, the image search unit 24 searches for the first image to which the tag coincident with the search key received by the first reception unit 18, for example, "children" is assigned from among the first images stored in the storage unit 22.

The subsequent operations are the same.

The feature value acquisition unit 20 may conceptually classify the feature values into a plurality of layers and may acquire the feature values.

In this case, the feature value acquisition unit 20 acquires, as the feature value, a feature value of a concept of a first layer which is the widest, and then acquires feature values of concepts from a second layer to an n-th layer sequentially narrower than the concept of the first layer in which n is an integer of 2 or more.

For example, it is conceivable that the feature value acquisition unit 20 acquires the feature values of the "subject" of the concept of the first layer by classifying the feature values into "landscape", "cityscape", "person", "vehicle", and the like. In this case, it is conceivable that the feature values of the "subject" in the second layer are acquired by further classifying the feature values into "children", "adult", "elderly", "male", "female", and the like among the individual "persons". The same applies to other subjects.

As the feature values of "scene" of the concept of the first layer, it is conceivable that the feature values are classified into "night view", "group photograph", "event", and the like. In this case, it is conceivable that the feature values of "event" are acquired by classifying the feature values into "sports meeting", "excursion", "amusement park", and the like among "events" as the feature values of "scene" of the concept of the second layer, and it is conceivable that the feature values are acquired by classifying the feature values into "foot race", "play", and the like among "sports meetings" as the feature values of "scene" of the third layer. The same applies to other scenes.

Here, for example, "foot race" and "play" can be distinguished based on the calculation of a moving speed of the subject, the calculation of a moving direction, and the detection of the movement of a part of the body such as a hand by image analysis. Specifically, in a case where the moving speed is high and a change in the moving direction is relatively small, it is possible to determine the sports meeting as "foot race". On the other hand, in a case where the moving speed is relatively slow, but the change in the moving direction is large and the movement of the hand is large, it is possible to determine the sports meeting as "play".

Subsequently, the image search unit 24 searches for a predetermined number of first images from among the first images stored in the storage unit 22 by using at least one of the feature values of the concepts from the first layer to the n-th layer. For example, one first image or a plurality of first images is searched for.

The subsequent operations are the same.

As stated above, it is possible to more accurately acquire the feature values representing the features of the image by acquiring the feature values classified into a plurality of layers, in other words, by acquiring the feature values of the concept of the lower layer. For example, as the feature values, "sports meeting" of the concept of the second layer is more accurate than "event" of the concept of the first layer, and "foot race" of the concept of the third layer is more accurate than "sports meeting" of the concept of the second layer.

In the apparatus according to the embodiment of the present invention, for example, a hardware configuration of a processing unit that executes various tasks of processing of the first reception unit 18, the feature value acquisition unit 20, the image search unit 24, the preference analysis unit 26, the set value acquisition unit 28, the first transmission unit 30, the second transmission unit 36, the input unit 38, the display control unit 40, the second reception unit 44, the setting unit 46, the imaging unit 48, and the like may be dedicated hardware, or may be various processors or computers that execute programs.

Various processors include a central processing unit (CPU) which is a general-purpose processor that functions as various processing units by executing software (program), a programmable logic device (PLD), which is a processor capable of changing a circuit configuration after manufacture, such as a field programmable gate array (FPGA), and a dedicated electric circuit, which is a processor having a circuit configuration specifically designed in order to perform specific processing such as an application specific integrated circuit (ASIC).

One processing unit may be constituted by one of these various processors, or may be constituted by a combination of two or more processors of the same type or different types, for example, a combination of a plurality of FPGAs or a combination of a CPU and an FPGA. The plurality of processing units may be constituted by one of the various processors or may be constituted by using one processor obtained by combining two or more of the plurality of processing units.

For example, one processor is constituted by a combination of one or more CPUs and software as represented by computers such as servers and clients, and this processor functions as the plurality of processing units. A processor that realizes the functions of the entire system including the plurality of processing units via one integrated circuit (IC) chip is used as represented by a system on chip (SoC).

A hardware configuration of these various processors is an electric circuitry in which circuit elements such as semiconductor elements are combined.

For example, a method according to the embodiment of the present invention can be implemented by a program causing a computer to execute steps. It is possible to provide a computer-readable recording medium having the program recorded thereon.

While the present invention has been described in detail, the present invention is not limited to the embodiment, and may be modified and change in various manners without departing the gist of the present invention.

EXPLANATION OF REFERENCES

10: imaging system
12: server
14: communication terminal
16: network
18: first reception unit
20: feature value acquisition unit
22: storage unit
24: image search unit
26: preference analysis unit
28: set value acquisition unit
30: first transmission unit
32: camera
34: mobile information terminal
36: second transmission unit
38: input unit 40: display control unit
42: display unit
44: second reception unit
46: setting unit
48: imaging unit

What is claimed is:

1. A server accessed by a plurality of communication terminals of a plurality of users, the server comprising:
a first processor,
wherein the first processor is configured to:
receive first images captured by one or more first communication terminals and set values regarding capturing of the first communication terminals in a case where the first images are captured from the first communication terminals,
receive a feature value of the first image determined based on an analysis of the first image for each first image,
store a table that includes the first image, the set value, and the feature value in association with each other for each first image in a memory,
search for the first image associated with a feature value coincident with or similar to a feature value of a second image received from a second communication terminal by the first processor from among the first images included in the table stored in the memory,
receive a set value determined to be associated with the first image searched for by the first processor from among the set values included in the table stored in the memory, and
transmit the set value acquired by the first processor to the second communication terminal,
wherein the first processor is further configured to:
acquire, as the feature value, a feature value of a concept of a first layer which is widest, and acquire feature values of concepts of a second layer to an n-th layer sequentially narrower from the concept of the first layer in which n is an integer of 2 or more, and
search for a predetermined number of the first images from among the first images stored in the memory by using at least one of the feature values of the concepts of the first layer to the n-th layer, and
wherein the feature value of the concept of at least one layer between the first layer to the n-th layer is associated with a plurality of scenes.

2. The server according to claim 1,
wherein the first processor is configured to:
store the first image, the set value, and the feature value in association with each other for each user in the memory,
analyze an image preference of a user of the second communication terminal based on the feature value of the first image of the user of the second communication terminal stored in the memory, and
search for a first image associated with a feature value coincident with or similar to the image preference of the user of the second communication terminal from among the first images stored in the memory.

3. The server according to claim 1,
wherein the first processor is configured to:
receive at least one of a positive evaluation or a negative evaluation voted for the first image by a user of the first communication terminal from the first communication terminal,
store the first image and the number of all evaluations voted for the first image in association with each other in the memory,
receive a search instruction based on the evaluation from the second communication terminal, and
search for a predetermined number of the first images based on the number of evaluations from among the first images stored in the memory in response to the instruction.

4. The server according to claim 3,
wherein the first processor is configured to:
receive a voting date and time of the evaluation from the first communication terminal,
store the first image and the voting date and time of the evaluation in association with each other in the memory,
receive a voting period of the evaluation from the second communication terminal, and
search for a first image for which the evaluation is voted at the voting date and time in the voting period of the evaluation form among the first images stored in the memory.

5. The server according to claim 1,
wherein the first processor is configured to:
receive a plurality of the second images from the second communication terminal,
estimate the feature value of the first image and the feature value of each second image by using a first determination model,
estimate degrees of similarity between the feature value of the first image and the feature values of the second images for each first image by using a second determination model,
calculate a total degree of similarity between the feature value of the first image and the feature values of the plurality of second images based on the degrees of similarity, and
search for a predetermined number of the first images from a side of which the total degree of similarity is the highest from among the first images stored in the memory.

6. The server according to claim 5,
wherein the first determination model is a trained model in which a first learning image and a feature value of the first learning image are used as pieces of first training data and a relationship between the first learning image and the feature value of the first learning image is trained for a plurality of the pieces of first training data, and
the second determination model is a trained model in which a feature value of a second learning image, a feature value of a third learning image, and a degree of similarity between the feature value of the second learning image and the feature value of the third learning image are used as pieces of second training data and a relationship between the feature value of the second learning image, the feature value of the third learning image, and the degree of similarity between the feature value of the second learning image and the feature value of the third learning image is trained for a plurality of the pieces of second training data.

7. The server according to claim 1,
wherein the first processor is configured to:
receive a plurality of the second images from the second communication terminal,
estimate the feature value of the first image and the feature value of each second image by using a first determination model, calculate distances between the feature value of the first image and the feature values of the second images for each first image, calculate a total degree of similarity between the feature value of the first image and the feature values of the plurality of second images based on the distances, and search for a predetermined number of the first images from a side on which the total degree of similarity is the highest from among the first images stored in the memory.

8. The server according to claim 1,
wherein the first processor is configured to:
store the first image, the set value, the feature value, and a text-format tag expressing the feature value of the first image in association with each other in the memory,
receive a text-format search key from the second communication terminal, and
search for the first image to which a tag coincident with the search key is assigned from among the first images stored in the memory.

9. The server according to claim 1,
wherein the first processor is configured to:
receive information on a first image selected by a user of the second communication terminal from among a plurality of the first images searched for by the first processor, and
acquire a set value associated with a first image corresponding to the information on the first image from among the set values stored in the memory.

10. The server according to claim 1,
wherein the set value includes at least one value of a stop, a shutter speed, a focal length, or an ISO sensitivity of the first communication terminal in a case where the first image is captured.

11. The server according to claim 1,
wherein the feature value includes at least one of header information of the first image, a subject appearing in the first image, or a scene of the first image.

12. An imaging system comprising:
the server according to claim 1; and
the plurality of communication terminals,
wherein the first communication terminal includes a second processor,
the second communication terminal includes a third processor,
the second processor is configured to transmit the first image and the set value to the server, and
the third processor is configured to:
receive the set value acquired by the first processor from the server,
set the set value received by the third processor for the second communication terminal, and
capture an image based on the set value set by the third processor.

13. The imaging system according to claim 12,
wherein the communication terminal includes a camera,
a camera of the first communication terminal includes the second processor,
a camera of the second communication terminal includes the third processor,
the second processor is configured to transmit the first image and the set value to the server, and
the third processor is configured to:
transmit the feature value of the second image to the server,
receive the set value acquired by the first processor from the server,
set the set value received by the third processor for the camera of the second communication terminal, and
capture an image based on the set value set by the third processor.

14. The imaging system according to claim 13,
wherein the following operations are repeated in which
the third processor is configured to recognize a subject appearing in a live preview image captured by the third processor, and output information on the subject, and
whenever the subject appearing in the live preview image is recognized by the third processor and different information on the subject is output,
the third processor is configured to transmit the information on the subject to the server,
the first processor is configured to:
receive the information on the subject from the camera of the second communication terminal,
search for a first image associated with a feature value of a subject coincident with or similar to the information on the subject from among the first images stored in the memory,
acquire a set value associated with the first image searched for by the first processor from among the set values stored in the memory, and
transmit the set value acquired by the first processor to the second communication terminal, and
the third processor is configured to:
receive the set value acquired by the first processor from the server, and
set the set value received by the third processor for the camera of the second communication terminal.

15. The imaging system according to claim 12,
wherein the communication terminal includes a camera having a communication function and an information terminal having a communication function,
an information terminal of the first communication terminal includes the second processor,
an information terminal of the second communication terminal includes a fourth processor,
a camera of the second communication terminal includes a fifth processor,
the second processor is configured to transmit the first image and the set value received from a camera of the first communication terminal by the communication function to the server,
the fourth processor is configured to transmit the feature value of the second image to the server, and receive the set value acquired by the first processor from the server, and
the fifth processor is configured to set the set value received from the information terminal of the second communication terminal by the communication function for the camera of the second communication terminal, and capture an image based on the set value set by the fifth processor.

16. A communication terminal comprising:
a second processor,
wherein the second processor is configured to:
transmit at least one of the first image, the set value, or the feature value of the second image to the server according to claim 1,
receive the set value acquired by the first processor from the server,
set the set value received by the second processor for the communication terminal, and capture an image based on the set value set by the second processor.

17. The server according to claim 1,
wherein the feature value of a scene of the concept of the first layer is classified into an event, and
the feature values of the scenes of the concepts of the second layer to the n-th layer are classified into events of concepts that are sequentially narrower from the event classified as the feature value of the scene of the concept of the first layer.

18. An imaging method in an imaging system that includes a plurality of communication terminals of a plurality of users and a server accessed by the plurality of communication terminals, the method comprising:
configuring a second processor of one or more first communication terminals to transmit first images captured by the first communication terminals and set values regarding capturing of the first communication terminals in a case where the first images are captured to the server;
configuring a first processor of the server to:
receive the first image and the set value of the first image from the first communication terminal;
receive a feature value of the first image determined based on an analysis of the first image for each first image; and
store a table that includes the first image, and the set value and the feature value of the first image in association with each other for each first image in a memory of the server;
configuring a third processor of a second communication terminal to transmit a feature value of a second image to the server;
configuring the first processor to receive the feature value of the second image from the second communication terminal;
configuring the first processor to:
search a first image associated with a feature value coincident with or similar to the feature value of the second image received by the first processor from among the first images included in the table stored in the memory;
receive a set value determined to be associated with the first image searched for by the first processor from among the set values included in the table stored in the memory; and
transmit the set value acquired by the first processor to the second communication terminal;
configuring the third processor to:
receive the set value acquired by the first processor from the server;
set the set value received by the third processor for the second communication terminal; and
capture an image based on the set value set by the third processor,
wherein the first processor is further configured to:
acquire, as the feature value, a feature value of a concept of a first layer which is widest, and acquire feature values of concepts of a second layer to an n-th layer sequentially narrower from the concept of the first layer in which n is an integer of 2 or more, and
search for a predetermined number of the first images from among the first images stored in the memory by using at least one of the feature values of the concepts of the first layer to the n-th layer, and
wherein the feature value of the concept of at least one layer between the first layer to the n-th layer is associated with a plurality of scenes.

19. A non-transitory computer-readable recording medium having a program causing a computer to execute the steps of the imaging method according to claim 18 recorded thereon.

20. The imaging method according to claim 18,
wherein the feature value of a scene of the concept of the first layer is classified into an event, and
the feature values of the scenes of the concepts of the second layer to the n-th layer are classified into events of concepts that are sequentially narrower from the event classified as the feature value of the scene of the concept of the first layer.

* * * * *